US012740640B1

(12) United States Patent
Aghaloo

(10) Patent No.: US 12,740,640 B1
(45) Date of Patent: Sep. 22, 2026

(54) COMBINED TOOTHBRUSH, DENTAL FLOSS DISPENSER, AND FLOSSING DEVICE

(71) Applicant: Javad Sage Aghaloo, El Centro, CA (US)

(72) Inventor: Javad Sage Aghaloo, El Centro, CA (US)

( * ) Notice: Subject to any disclaimer, the term of this patent is extended or adjusted under 35 U.S.C. 154(b) by 405 days.

(21) Appl. No.: 18/482,133

(22) Filed: Oct. 6, 2023

Related U.S. Application Data

(60) Provisional application No. 63/417,448, filed on Oct. 19, 2022.

(51) Int. Cl.
*A46B 15/00* (2006.01)
*A46B 9/04* (2006.01)
*A61C 15/04* (2006.01)

(52) U.S. Cl.
CPC ............ *A46B 15/0073* (2013.01); *A46B 9/04* (2013.01); *A61C 15/043* (2013.01); *A61C 15/046* (2013.01); *A46B 2200/1066* (2013.01)

(58) Field of Classification Search
CPC ..... A46B 15/0073; A61C 15/00; A61C 15/04; A61C 15/043; A61C 15/046
See application file for complete search history.

(56) References Cited

U.S. PATENT DOCUMENTS 1,738,389 A 12/1929 Oliver
2,113,439 A * 4/1938 Bean .................. A46B 15/0071 132/309
7,201,172 B2 4/2007 Nanda
9,301,820 B2 * 4/2016 Hintz ..................... B65D 51/28
2004/0040571 A1 3/2004 Williams, Sr. et al.
2004/0134510 A1 * 7/2004 van Vilsteren ..... A46B 15/0071 132/309
2006/0086369 A1 4/2006 Wilkinson
2009/0188519 A1 7/2009 Van Buskirk et al.
2013/0000658 A1 1/2013 Nguyen et al.
2017/0105517 A1 4/2017 Petrov et al.
2017/0172715 A1 * 6/2017 Duong ................. A61C 15/043

FOREIGN PATENT DOCUMENTS

WO 2006104470 A1 10/2006
WO WO-2020183759 A1 * 9/2020 ............ A61C 15/04

* cited by examiner

*Primary Examiner* — Shay Karls
(74) *Attorney, Agent, or Firm* — John Rizvi; John Rizvi, P.A.—The Patent Professor®

(57) ABSTRACT

There is provided herein a combined toothbrush, dental floss dispenser and flossing device. The device contains an elongate longitudinal body having a toothbrush at a first end; a fork located at an opposing second end. The fork can comprise a fork base having a button with an underlying recess, thereon, and two fork tines extending from the fork base. The device can also comprise a handle having a hollow portion containing spooled floss therein which is located between the first end and the second end of the device. The hollow portion of the hand can have a removable cover thereover, the outside surface of which contains a threading hole for threading the floss therethrough, and a floss cutter. The device can contain spooled floss present in the hollow portion which is sufficient for up to two months of daily use. There is also provided a method of (a) providing the noted device, (b) employing the toothbrush and flosser until the floss is exhausted, (c) discarding the device; and (d) acquiring a new toothbrush.

20 Claims, 6 Drawing Sheets

COMBINED TOOTHBRUSH, DENTAL FLOSS DISPENSER, AND FLOSSING DEVICE

CROSS-REFERENCE TO RELATED APPLICATIONS

This application claims the benefit of Unites States Provisional Patent Application Ser. No. 63/417,448, filed on Oct. 19, 2022, which is incorporated by reference herein in its entirety.

FIELD OF THE INVENTION

The present invention relates generally to the field of oral hygiene. More particularly, the present invention relates generally to toothbrushes and dental floss flossers.

BACKGROUND OF THE INVENTION

The practice of good dental hygiene consists of brushing one's teeth, preferably multiple times each day and flossing at least once a day, if not more. These dental habits entail having ready access to at least a toothbrush, toothpaste, and dental floss at several points in the day.

While toothbrushes can brush the flat surfaces of the front and back of most people's teeth, often such brushing alone is not sufficient to provide for proper tooth cleaning. Thus, it is generally recommended that people employ dental floss between the teeth in addition to toothbrushing. The use of dental floss can clean between the teeth and the side surfaces of the teeth which are difficult or impossible to access with just a toothbrush. The use of dental floss generally involves wrapping a length of dental floss around two separate fingers of two different hands and rubbing the intervening floss between the teeth. However, this technique often requires that one's mouth be opened to an uncomfortable degree for a prolonged period of time.

One method that has been employed to address the issue of the lack of comfort in flossing is the use of floss threaders. To have proper effect, floss threaders must be utilized immediately before or after brushing one's teeth in order to provide for a complete and thorough cleaning. Nonetheless, such floss threaders can be easily lost or misplaced, and further, they tend to be viewed by some as optional in use. Still further, dental flossers are not generally available to those who are economically challenged and/or are not readily appreciated in terms of their necessity by such groups, and thus, may often go unused. Thus, poor dental regimens tend to be developed, which can lead to poor oral hygiene.

Another challenge for oral hygiene is that often enough, people, especially those who are economically challenged, tend to overuse a toothbrush. The overuse may be due to an overly aggressive brushing technique which prematurely breaks down the strength of the brush bristles, or alternatively, may be due to employing the toothbrush for a period beyond its intended lifespan due to the inconvenience and cost of replacing the brush. Finally, most people are generally unaware of when their toothbrush has reached its limit in terms of effective utility and will continue to use a toothbrush even if the bristles are damaged or if a prolonged period of time has elapsed.

While some toothbrushes employ color markings on the bristles which are worn away over time to indicate the need for replacing the brush, often such color degradation is hard to readily appreciate since it occurs so gradually, and even if it is noticed, a person may continue to use the brush because the bristles still appear generally intact. While the bristles of a toothbrush may appear from a visual inspection to be largely intact even after prolonged use, their ability to clean may be impaired due to an invisible loss of firmness of the bristles. Thus, even though people may continue to brush their teeth, and even if they also floss with a floss threader thereafter, their dental regimen may still remain lacking and thus, may still leave them prone to dental decay.

On the other hand, most dentists recommend the use of a soft-bristle brush. The reason being that many people tend to be overzealous in brushing their teeth and the use of a hard bristle brush can over time, damage the enamel of the teeth and the surrounding gums. Thus, even when people follow their dentists' recommendations as to using a soft bristle toothbrush, they tend to believe that their teeth are not being effectively cleaned and as such, will often quickly cycle through brushes which still have plenty of usual life in them.

Accordingly, there remains a need for a solution to at least one of the aforementioned problems. For instance, there is an established need for a dental device which is affordable, readily accessible, and which can facilitate and encourage the regular completion of the thorough dental regimens of brushing and flossing, while somehow conveying to the user of the device as to when their toothbrush has reached the end of its useful life.

SUMMARY OF THE INVENTION

The present invention can be directed to a combined toothbrush and dental flosser device, which can interchangeably be used in ready succession and with relative ease, using any and all of the embodiments described herein. Further, it has been surprisingly found that when the device also contains a floss dispenser, with a specifically predetermined length of dental floss, e.g., a two-month supply, and when the user brushes and flosses in proper frequency, the completion of the floss supply can provide a distinct and abrupt prompt to the user that the toothbrush should be replaced. If a user continues to try and use the brush beyond this period, the inability to continue the flossing step of the previous habitual brushing and flossing will be continually flagged to the user until the brush is replaced. Such a signal can be more paramount and notable than previously known methods of informing the user of the need for a new toothbrush.

In a first implementation of the invention there can be provided herein a combined toothbrush, dental floss dispenser, and flossing device comprising:

an elongate longitudinal body having a toothbrush at a first end of the elongate longitudinal body, which has toothbrush bristles emanating from a brushing side of the elongate longitudinal body;

a fork located at an opposing second end of the elongate longitudinal body which fork comprises a fork base which has a button having an underlying recess, which button is positioned on the brushing side of the elongate longitudinal body, and two fork tines extending from the fork base, said fork tines having angled terminating portions which are angled and directed towards an opposing flossing side of the elongate longitudinal body; and, a handle having a hollow portion containing spooled floss therein, which handle is located between the first end and the second end of the elongate longitudinal body, and which hollow portion has a removable cover thereover having an outside surface commensurate with the brushing side, and an inside surface facing the hollow portion containing the floss when affixed thereover, the outside surface having thereon a threading hole for threading the floss therethrough from the hollow portion, and a floss cutter, the floss cutter being located between the threading hole and the button having the underlying recess, and wherein, the amount of spooled floss present in the hollow portion is sufficient for up to two months of daily use.

In one aspect of the invention, the combined toothbrush, dental floss dispenser, and flossing device is made up of one elongate longitudinal body which can have an overall length of from about 4 inches to about 7 inches, preferably from about 5 inches to about 6 inches. The entire elongate body can preferably be made of the same or varied materials, such as the non-limiting examples of polyethylene and polypropylene, or natural materials such as bamboo.

It will be understood herein that the elongate longitudinal body can have a toothbrush at a first end with the toothbrush bristles being on a brushing side and can have a flossing device on the opposing second end which flossing device can be a fork having fork tines pointing in a direction towards an opposing flossing side. The handle having a hollow portion containing spooled floss therein, can be located between the first end and the second end of the longitudinal body.

In another aspect of the invention, the toothbrush at a first end of the elongate longitudinal body, can have toothbrush bristles emanating at a 90-degree angle from a brushing side of the elongate longitudinal body, i.e., the bristles can be perpendicular to the brushing surface of the longitudinal body. In one embodiment those bristles can be made of a synthetic plastic such as the non-limiting example of nylon, or alternatively, the bristles can be made of natural sources such as the non-limiting examples of boar hair, horse hair, and hog hair, or can be natural plant-based bristles such as those made from castor bean oil, tapioca or corn, and the like.

Nylon bristles can be soft, medium, or hard. A soft bristle can generally have a thickness around of from about around 0.10 mm to about 0.18 mm, preferably from about 0.12 mm to about 0.16 mm, and most preferably from about 0.14 mm to about 0.16 mm. Hard bristles can generally have bristles of from about 0.18 to about 0.25 mm, preferably from about 0.21 mm to about 0.24 mm and most preferably from about 0.22 mm to about 0.24 mm. Generally, the bristles can have a length of from about 8 mm to about 12 mm. More preferably, the bristles can be non-undulating bristles.

In yet another aspect of the invention, the fork located at the opposing second end of the elongate longitudinal body can have a fork base which can be a flat section of the elongate longitudinal body which can progressively increase in width as length of the fork base proceeds and transitions from the start of the fork base immediately after the floss cutter, and moves into the fork tines and through the angled portion thereof, i.e., as the length of the device proceeds from the start of the fork base immediately after the floss cutter in the direction of the second end. The fork base and fork tines can generally together be formed in the shape of the capital letter Y. The fork base can have a length of from about 0.5 to 1.0 inches. The width at the beginning of the fork base, e.g., the bottom of the letter Y, i.e., the area directed towards the second end which area begins beyond the floss cutter section described herein, can be from about 0.25 inches to about. 75 inches, with the end of the fork base right before the tines (wherein the two top angled lines of the letter Y meet the straight line) being from about 0.4 to about 1.0 inches in width.

In yet even another aspect of the invention, the button located on the fork base, and which has an underlying recess can have a top button surface diameter of from about 0.25 inches to about 1.0 inches, preferably about 0.5 inches to about 0.75 inches. The button can have an underlying recess which can be of a depth sufficient to wrap and hold from about 5 to about 10 cm of dental floss, without being able to slip over the top of the button. Stated alternatively, the recess is a circular post area wherein the circular post has a diameter which can be less than the diameter of the button, and which can generally be from about 0.10 inches about 0.75 inches, preferably from about 0.25 inches to about 0.50 inches. The recess (circular post area beneath the button) can have a length emanating from the surface of the base of the fork of about 0.5 cm to about 1.5 cm beneath the surface of the overlying button.

In yet still even another aspect of the invention, the two fork tines which can extend from the fork base, e.g., the tines forming the angled lines of the letter Y, can each have the same length and construction. Preferably, the tines can each be of a length of from about 2 inches to about 4 inches, preferably from about 2.5 inches to about 3.5 inches and can have a thickness of from about 0.1 cm to about 0.5 cm. The tines are preferably of a construction such that they can be flexible and moveable for easy access to hard-to-reach areas of the mouth.

In one embodiment, the tines can be angled at an angle of from about 10 degrees to about 20 degrees which is the angle formed from the intersection a straight line along the center of the longitudinal length of the elongate body which passes through the threading hole and a straight line connecting the point of the threading hole and the tip of each of the respective tines. Each tine can form the same angle with center line. In one embodiment herein, the angle is depicted as the angle alpha ($\alpha$) in FIG. 3 between the dashed line and the solid line depicting the floss 142.

In another aspect of the invention, the angled terminating portions which are angled and directed towards an opposing flossing side of the elongate longitudinal body can have an angle towards the flossing section of from about 110 to about 130 degrees, said angle being formed from the intersection of a line passing through the center of the portion of the tine which is angled towards the flossing side with a line passing through the center of the portion of the tine which is not angled. This angle is shown in FIG. 2 as the angle beta ($\beta$) between the two dashed lines along the lower of the two tines 122

In yet another aspect of the invention, each of the tines can have a channel formed therein which can extend from the tip of the tine to about ½ the length of the tine, and which can pass through the entire angled portion of the tine. Each tine can end in a protrusion tip which can protrude from an inside half of the channel of the angled tine and can generally be from about 1 mm to about 3 mm, preferably about 2 mm.

In yet even another aspect of the invention, the handle can have a hollow portion containing spooled floss therein, and which is located between the first end and the second end of the elongate longitudinal body and may be a plastic handle. The plastic handle can be of the type of plastic as described herein above and can be of a size which can be grasped by a human hand. The handle can provide for better control and dexterity in using the toothbrush as well as the floss threader described herein.

In yet even still another aspect of the invention, the handle having a hollow portion can be of a size in circumference which is sufficient to accommodate the grasp of a human hand, and thus, due to the differences in human hand sizes, the handle having a hollow portion can be of different thickness and lengths and be set for a particular person, such as a man, woman, or child.

Generally, the handle having a hollow portion can be of a shape and size that can be commensurate with a conventional toothbrush handle. For example, the handle having a hollow portion can be of from about 4 to about 6 inches, preferably from about 4 to 5 inches in length, and from about 0.5 cm to about 2.5 cm, preferably from about 1 cm to about 2 cm in width. The handle having a hollow portion can preferably be made of a plastic material that is described herein above, and preferably one that is biodegradable and/or recyclable such as polypropylene.

The recitation of the removable cover having an outside surface which is commensurate with the brushing side can be understood to mean that the cover is located on the same side of the elongate longitudinal body as the brush bristles found on the brushing side of the first end.

In one other aspect of the invention, the removable cover over the hollow portion of the handle can be affixed thereover by means of any conventional closing means, such as, but not limited to a hinge, or any injection molded plastic closure means such as a snap-fit closure, a male post and a corresponding female acceptor hole, and the like. Preferably the closure is a combination of a set of two or more male posts located on the inside surface of the cover which faces the hollow portion containing the floss, and a set of at least two corresponding located female acceptor holes on the inside of the hollow portion of the handle, both of which can snap fit together.

In yet another aspect of the invention, the threading hole located on the outside surface of the cover over the hollow portion can have a size sufficient to thread dental floss therethrough. Preferably the threading hole can have a diameter of from about 8 microns to about 40 microns, preferably from about 10 microns to about 25 microns.

In yet even another aspect of the invention floss cutter, can be any conventional floss cutter, and can in one embodiment, entail a prong of thin metal emanating at an angle from the surface of the cover, and preferably having a sharp edge thereto for cutting the floss.

In yet still even another embodiment, the amount of spooled floss present in the hollow portion is sufficient for up to two months of daily use, which can vary depending on the user from about 1000 inches to about 2,000 inches, preferably from about 1,200 inches to about 1,500 inches and most preferably from about 1,300 inches to about 1,400 inches of floss. The type of floss can preferably be other than polytetrafluoroethylene (PTFE) floss, and more specifically can be selected from unwaxed or waxed nylon floss, dental tape, super flosses, biodegradable silk floss, bamboo charcoal floss, and other naturally originating floss materials.

In another aspect of the invention, suitable floss lengths can be designated by colored lines on the length of floss which is located in the spool. Some non-limiting examples of lengths of floss which may be delineated by the colored lines can be from about 8 inches to about 12 inches, preferably from about 9 inches to about 11 inches, and most preferably about 10 inches.

In yet another aspect of the invention, the threaded hole and the floss cutter can have a cover thereover for hygienic purposes during sale, which can in some embodiments be retained during use of the device described herein.

In a second implementation of the invention there can be provided herein a method of cleaning teeth employing the combined tooth brush, dental floss dispenser, and flossing device described herein. The method can comprise, either first or second, brushing the teeth of a user in need of oral hygiene with the toothbrush portion of the device described herein. Thereafter, or prior to the same, one can employ the dental floss dispenser to dispense dental floss to the flossing device, and thereafter, floss the teeth of a user in need of oral hygiene.

In one aspect of the invention, a user in need of oral hygiene can be any man, woman or child who brushes their teeth and flosses on a daily basis.

In another aspect of the invention, the dental floss can be dispensed from the dispenser by pulling a length of dental floss through the threading hole, such as the lengths described herein above, e.g., the colored line spacing lengths described above, e.g., from about 8 inches to about 12 inches. Thereafter, the dental floss can be wrapped around the recess of the button located on the top of the fork base at least one-time therearound in either a clockwise or counter clockwise direction, although wrapping the floss around two, three or more times is envisioned. Thereafter the dental floss can be placed in the channel of one of the fork tines proceeding in a direction of the second end and held alongside the protruding tip of the tine. Thereafter the two tines can be squeezed together a suitable distance, e.g., from about 1 to about 2 inches, in the direction of the two upper parts (e.g., the tips) of the letter Y shaped tines being squeezed directly towards each other, while the dental floss is extended over the distance between the two tines and around the protruding tip of the other tine and down (in a direction towards the first end) the channel of the other tine and wrapped around the recess of the button at least one time in the same clockwise or counter clock-wise direction previously done, although wrapping the floss around two, three or more times is envisioned, and doing so prior to releasing the squeezing of the two tines.

In one embodiment, the floss can be wrapped around the recess of the button both times and/or the tines can be flexed to a degree such that when the tines are released the tension of the floss between the two tines is sufficient to floss the user's teeth. In one more specific embodiment, the floss can be re-threaded and wound in the event the tension in the floss threader is insufficient or deteriorates during use.

Thereafter the remaining dispensed floss, if any, can be cut by the floss cutter. Thereafter the floss between the two tines can be used to floss the teeth of the user of the device. Thereafter, the floss can be removed from the device in the reverse manner it was applied and the hygienic cover over the threading hole and floss cutter can optionally be reapplied. The method can be repeated for a period of up to two months, at which point the floss supply in the device will be exhausted. The end of the floss supply will prompt the user to either optionally purchase a new device or to at least purchase a new tooth brush.

In a second implementation of the invention there can be provided herein a method of determining when to replace a toothbrush, the method comprising:

(a) providing the combined toothbrush, dental floss dispenser and flossing device described herein;
(b) employing the toothbrush and floss on a daily basis as described herein for a period of time until the supply of floss is exhausted; and optionally,
(c) discarding the device; and, optionally,
(d) acquiring a new toothbrush.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1 and/or FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
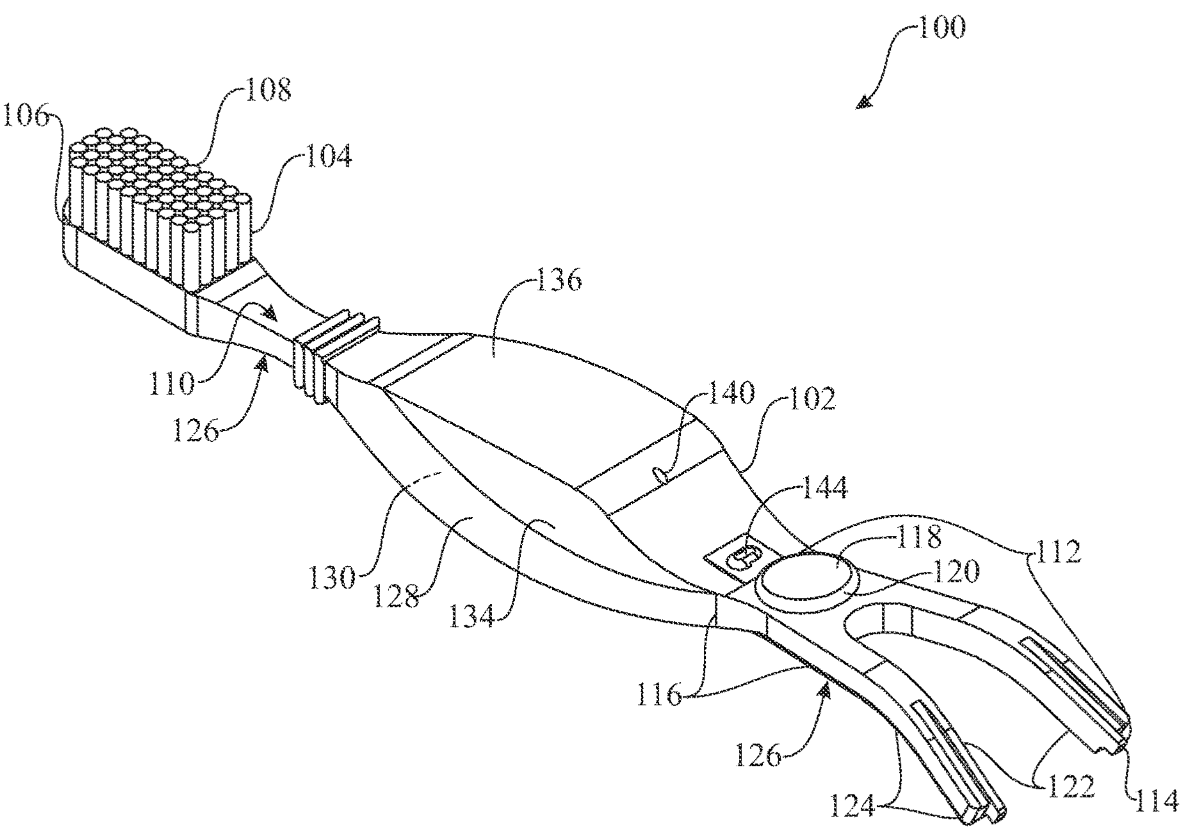
FIG. 1 present a perspective view of the combined toothbrush, dental floss dispenser and flossing device of the present invention.

Referring initially to FIG. 1, there is provided a combined tooth brush, dental floss dispenser and flossing device 100 ("device 100"). The device 100 has an elongate longitudinal body 102 having a tooth brush at a first end 106 thereof. The toothbrush 104 has tooth brush bristles 108 which can emanate from a brushing side 110 of the elongate longitudinal body 102. The tooth brush bristles 108 can be such as those described herein and can be used to brush the teeth of a user (not shown).

The device 100 also can contain a fork 112 which can be located at an opposing second end 114 of the elongate longitudinal body 102. The fork 112 can contain a fork base 116 which can have a button 118 having an underlying recess 120 (see FIGS. 5 and 7 more specifically). The button 118 can be positioned on the brushing side 110 of the elongate longitudinal body 102. The fork 112 can also contain two fork tines 122 which can extend from the fork base 116. The two fork tines 122 can have angled terminating portions 124 which can be angled and directed towards an opposing (i.e., opposing to the brushing side 110) flossing side 126 of the elongate longitudinal body 102. The angling and angles can be those described herein.

Figure 8:
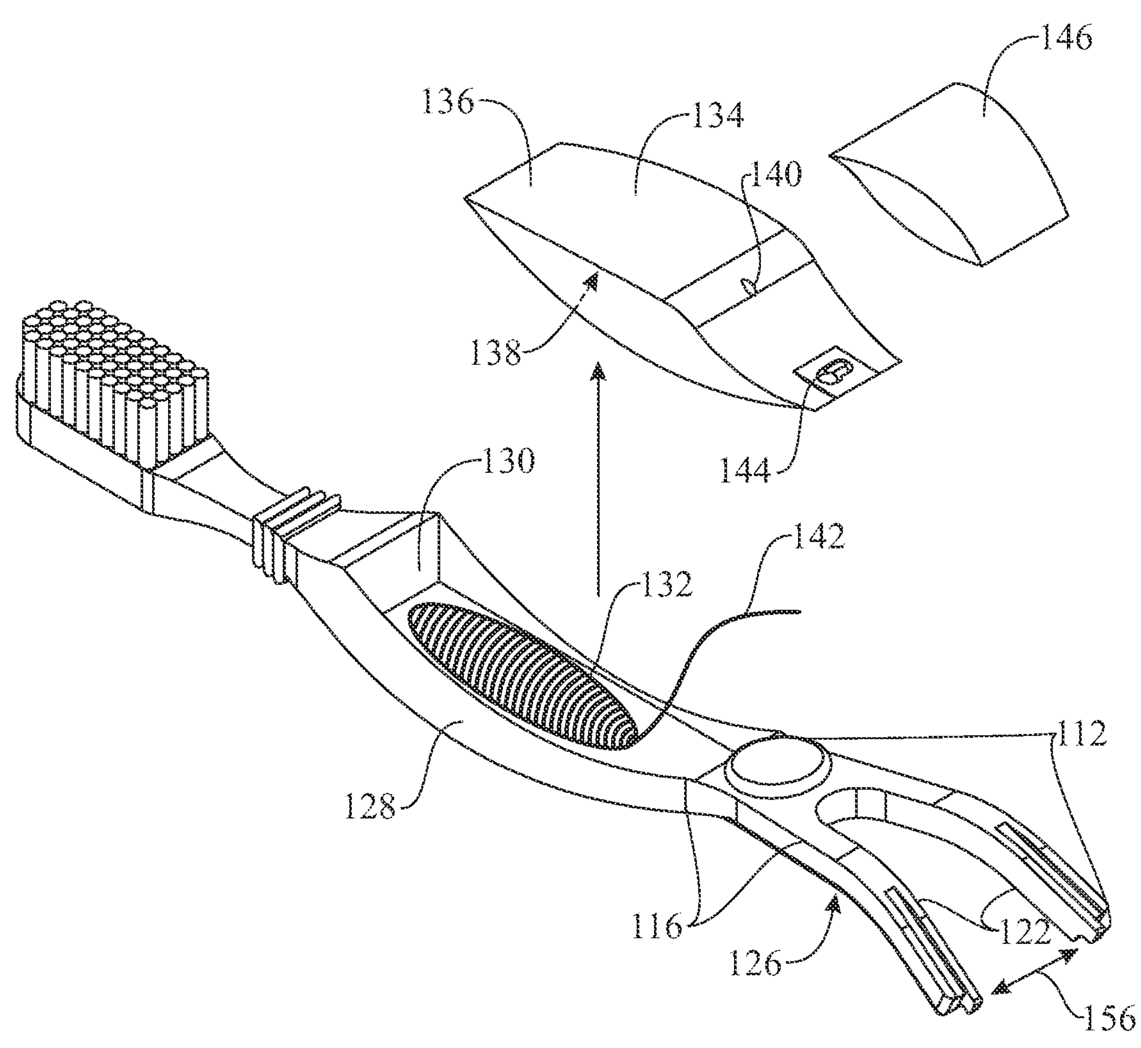

Referring now to FIGS. 1 and 8, the device 100 can also contain a handle 128 having a hollow portion 130 (see FIG. 8) which can contain spooled floss 132 therein. The handle 128 can be located between the first end 106 and the opposing second end 114 of the elongate longitudinal body 102.

Figure 2:
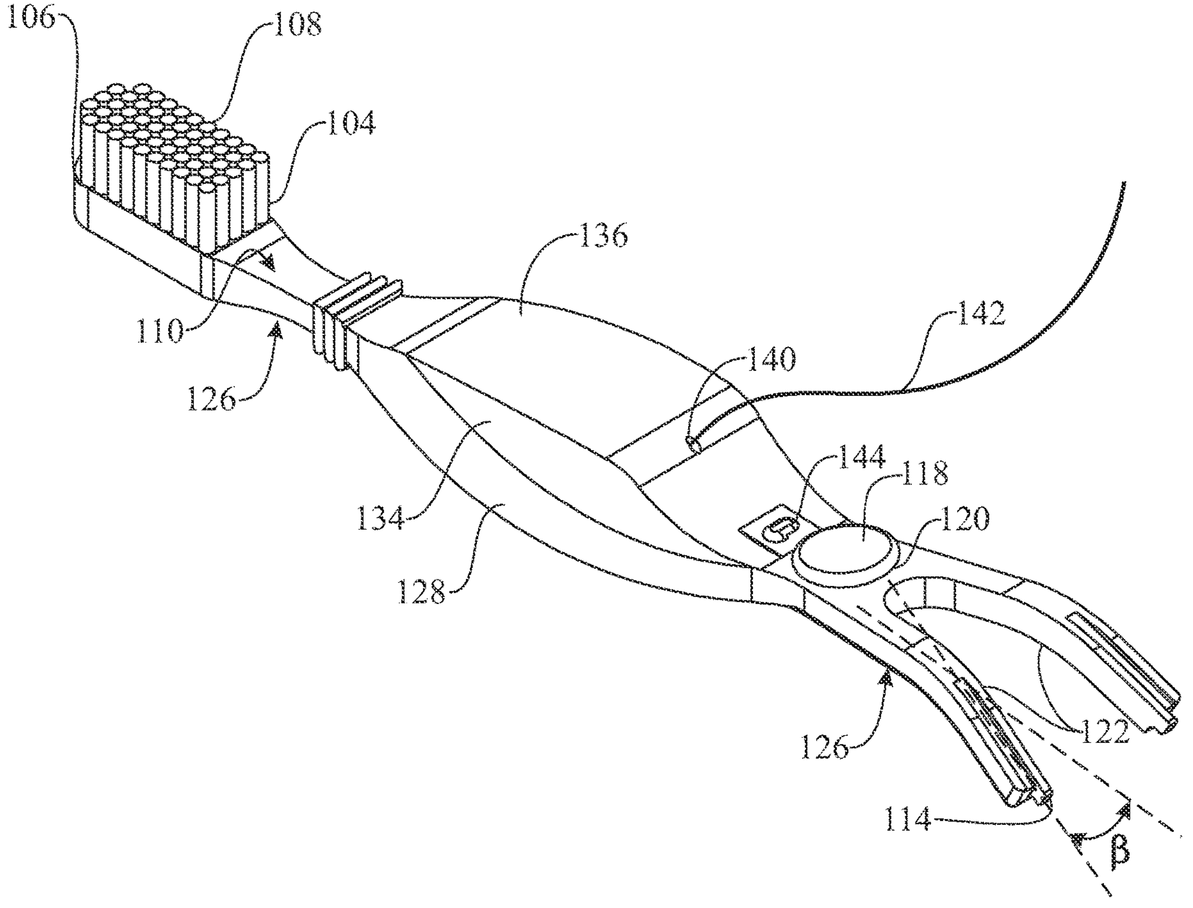
FIG. 2 presents a perspective view of the combined toothbrush, dental floss dispenser and flossing device of the present invention having dental floss being dispensed therefrom.

Referring now to FIGS. 1, 2 and 8 the hollow portion 130 of the handle 128 can have a removable cover 134 thereover. The removable cover 134 can have an outside surface 136 which is commensurate with, i.e., flush with, the brushing side 110. The removable cover 134 can also have an inside surface 138 which faces the hollow portion 130 containing the spooled floss 132 when affixed thereover. The outside surface 136 can have thereon a threading hole 140 there through for threading floss 142 there through from the hollow portion 130. The removable cover 134 can also have a floss cutter 144 thereon. The floss cutter 144 can be located in a location on the elongate longitudinal body 102 which is between the threading hole 140 and the button 118. The amount of floss 142 in the spooled floss 132 present in the hollow portion 130 is sufficient for up to two months of daily use as per the daily use (i.e., the lengths of floss) of floss described herein. Further still the removable cover 134 can have an optional hygienic cover 146 located partially over removable cover 134, which hygienic cover 146 can be provided and removed prior to first use, or which hygienic cover 146 can be retained and used to cover the threading hole 140 and floss cutter 144 after each use of the device 100 as described herein.

Referring now to FIGS. 1-8, there is provided a method of determining when to replace a toothbrush, the method can comprise (a) providing the device 100 as described herein; (b) employing the device 100 on a daily basis for a period of time until the supply of floss 142 is exhausted. The user (not shown) can either first brush their teeth (not shown) with the toothbrush portion 104 of the device 100 described herein, or alternatively, first employ the device 100 to dispense dental floss 142 to the fork 112 and floss the teeth of a user in need of oral hygiene (not shown). Whichever of brushing or flossing is first conducted, the other remaining step of flossing or brushing can be conducted second.

Figure 3:
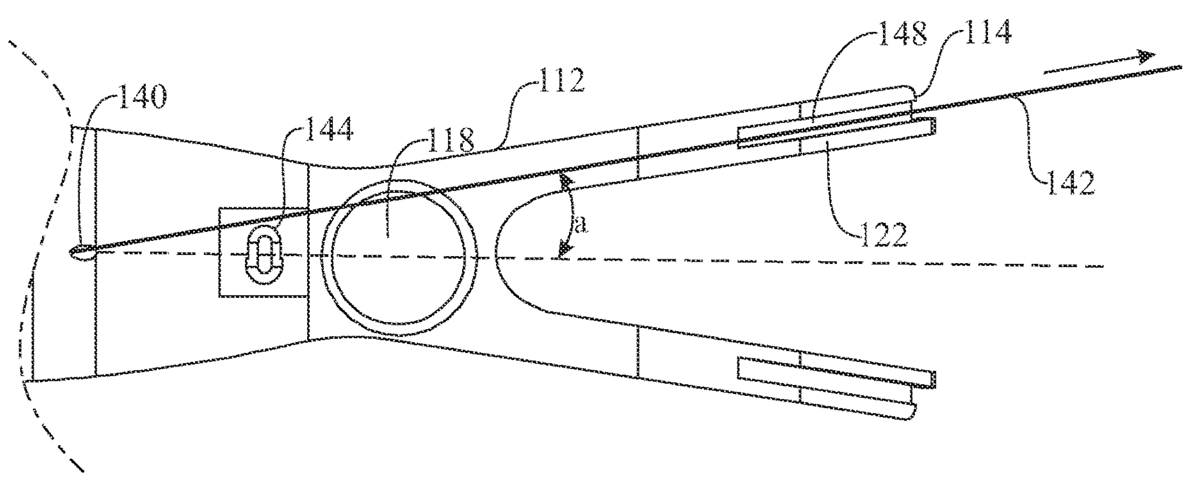
FIG. 3 presents a close-up perspective view of the dental floss dispenser and flossing portion of the device of the present invention having dental floss being dispensed therefrom in a set length comporting with a first step of the method described herein.

Referring now to FIG. 3, to prepare the device 100 for flossing, the dental floss 142 can be dispensed from the device by pulling a length of dental floss 142 through the threading hole 140, such as the lengths described herein above, e.g., the colored line spacing lengths described above, e.g., from about 8 inches to about 12 inches.

Figure 4:
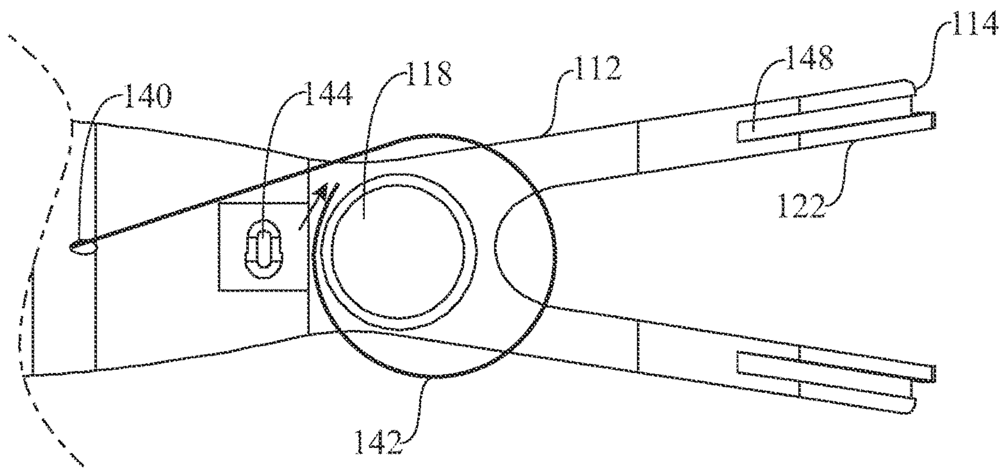
FIG. 4 presents a close-up perspective view of the dental floss dispenser and flossing portion device of the present invention having the set length of dispensed dental floss being wound around the recess of the button of the device in a second step of the method described herein.

Referring now to FIG. 4, the dental floss 142 can be wrapped around the recess 120 of the button 118 located on the brushing side 110 of the fork base 116 at least one-time therearound in either a clockwise direction (shown) or a counter clockwise direction (not shown).

Figure 5:
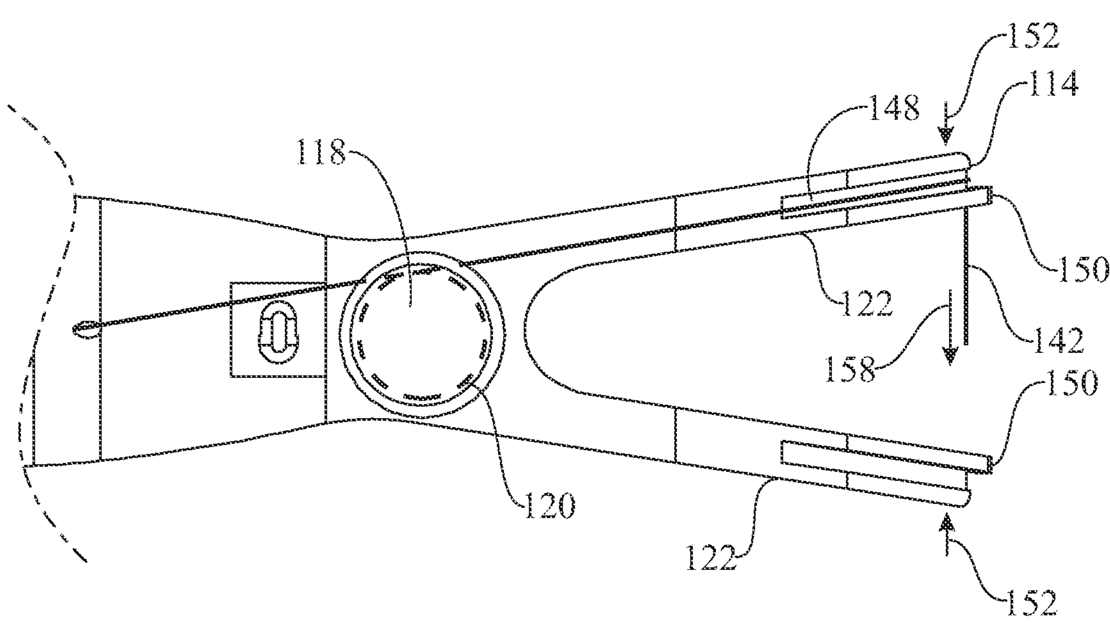
FIG. 5 presents a close-up perspective view of the dental floss dispenser and flossing portion of the device of the present invention showing the remaining length of dispensed dental floss being placed in the channel of one of the fork tines proceeding in a direction of the second end and held alongside the protruding tip of the tine and then being extended over a part of the distance between the two tines in a third step of the method described herein.
Figure 6:
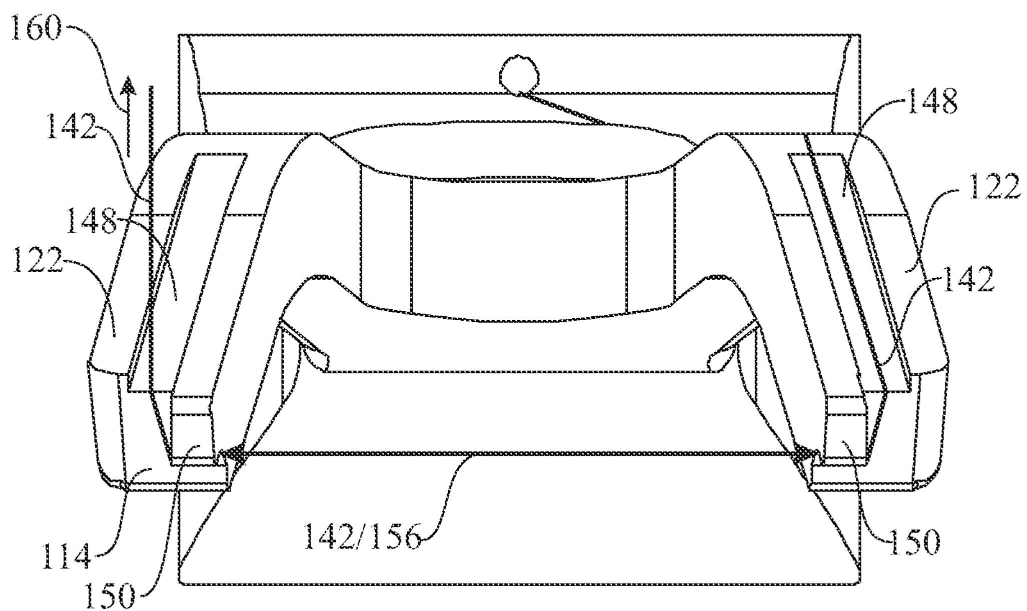
FIG. 6 presents a close-up head on view of the protruding tips of the fork tines showing the remaining length of dispensed dental floss being placed in both of the fork tines and proceeding down (in a direction towards the first end) the channel of the left-most tine in a fourth step of the method described herein.

Referring now to FIGS. 5 and 6, thereafter, the dental floss 142 can be placed in a channel 148 of one of the fork tines 122 proceeding in a direction of the second end 114 and held alongside a protruding tip 150 of the tine 122. Thereafter the two tines 122 can be squeezed by the user (not shown) together a suitable distance, e.g., from about 1 to about 2 inches, in the direction of the two upper parts (e.g., the tips) of the letter Y shaped tines being squeezed directly towards each other, which squeezing direction is shown by the small arrows 152, while the dental floss 142 is extended over the distance 156 between the two tines 122 (in the direction shown by arrow 158) and around the protruding tip 150 of the other tine 122 and down (in a direction towards the first end 106, shown by arrow 160) the channel 148 of the other tine 122.

Figure 7:
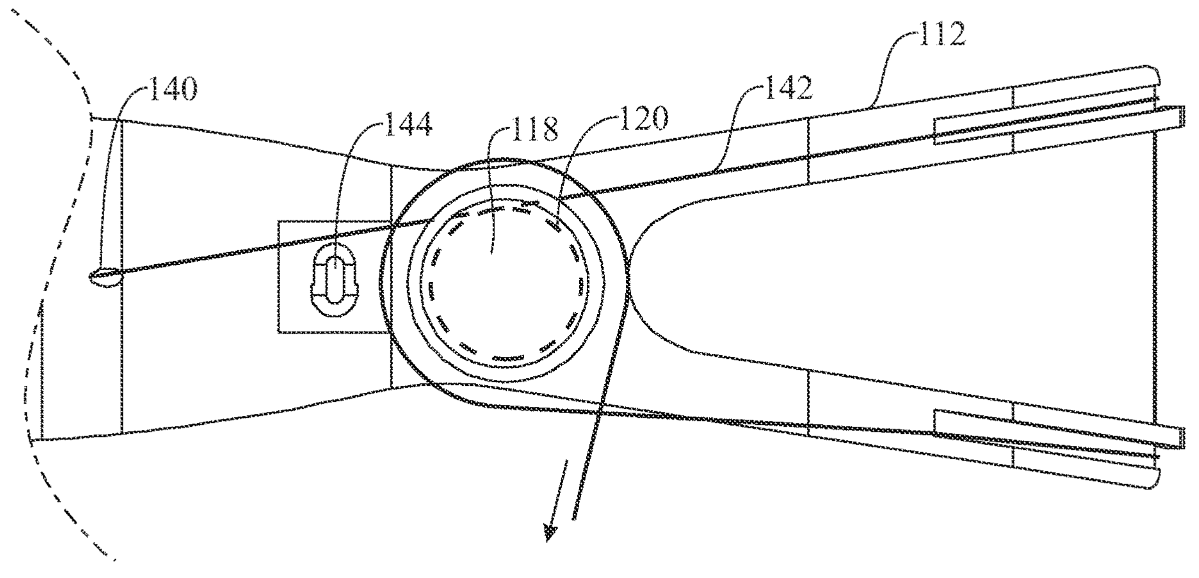
FIG. 7 presents a close-up perspective view of the dental floss dispenser and flossing portion of the device of the present invention showing the remaining length of dispensed dental floss being wound around the recess of the button of the device at least one time in the same clockwise or counter clock-wise direction previously done, and as done in a fifth step of the method described herein; and, FIG. 8 presents a perspective view of the combined toothbrush, dental floss dispenser and flossing device of the present invention having a removable cover of the hollow portion of the handle of the invention showing the removable cover removed from the handle and the spool of dental floss therein.

Referring next to FIG. 7, thereafter the floss 142 is wrapped around the recess 120 (shown underneath the button as a dashed line) of the button 118 at least one time in the same clockwise direction (shown) or counter clockwise direction (not shown) previously done, and such wrapping can be done prior to releasing the squeezing of the two tines in the direction 152.

Thereafter the remaining dispensed floss 142, if any, can be cut by the floss cutter 144. Thereafter the floss 142 between the two tines 122 can be used to floss the teeth of the user (not shown) of the device 100. Thereafter, the floss 142 can be removed (not shown) from the device 100 in the reverse manner it was applied and the hygienic cover 146 can be applied over the threading hole 140 and floss cutter 144. The method can be repeated for a period of up to two months, at which point the floss supply in the device will be exhausted.

The method can then comprise the further steps of (c) discarding the device 100; and (d) acquiring a new toothbrush.

In an alternate embodiment described herein the tines of the fork are not arced.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A combined tooth brush, dental floss dispenser, and flossing device comprising:

an elongate longitudinal body having a toothbrush at a first end of the elongate longitudinal body, which has toothbrush bristles emanating from a brushing side of the elongate longitudinal body;

a fork located at an opposing second end of the elongate longitudinal body which fork comprises a fork base which has a button having an underlying recess, which button is positioned on the brushing side of the elongate longitudinal body, and two fork tines extending from the fork base, said fork tines having angled terminating portions which are angled and directed towards an opposing flossing side of the elongate longitudinal body; and, a handle having a hollow portion containing spooled floss therein which handle is located between the first end and the second end of the elongate longitudinal body, and which hollow portion has a removable cover thereover having an outside surface commensurate with the brushing side, and an inside surface facing the hollow portion containing the floss when affixed thereover, the outside surface having thereon a threading hole for threading the floss therethrough from the hollow portion, and a floss cutter, the floss cutter being located between the threading hole and the button having the underlying recess, and wherein, the amount of spooled floss present in the hollow portion is sufficient for up to two months of daily use.

2. The combined toothbrush, dental floss dispenser, and flossing device of claim 1, wherein the elongate longitudinal body is one elongate longitudinal body which has a length of from about 4 inches to about 7 inches.

3. The combined toothbrush, dental floss dispenser, and flossing device of claim 1, wherein the elongate longitudinal body has a toothbrush at a first end with the toothbrush bristles being on a brushing side and a flossing device on the opposing second end which flossing device is a fork having fork tines pointing in a direction towards an opposing flossing side.

4. The combined toothbrush, dental floss dispenser, and flossing device of claim 1, wherein, the toothbrush has toothbrush bristles emanating at a 90-degree angle from a brushing side of the elongate longitudinal body.

5. The combined toothbrush, dental floss dispenser, and flossing device of claim 1, wherein, the fork has a fork base which is a flat section of the elongate longitudinal body which progressively increases in width as length of the fork base proceeds and transitions from the start of the fork base immediately after the floss cutter and moves into the fork tines and through the angled portion thereof.

6. The combined toothbrush, dental floss dispenser, and flossing device of claim 1, wherein the fork base and fork tines together form a shape of the capital letter Y.

7. The combined toothbrush, dental floss dispenser, and flossing device of claim 1, wherein the button located on the fork base which has an underlying recess has a top button surface diameter of from about 0.25 inches to about 1.0 inches.

8. The combined toothbrush, dental floss dispenser, and flossing device of claim 1, wherein the button can have an underlying recess is of a depth sufficient to wrap and hold from about 5 cm to about 10 cm of dental floss, without being able to slip over the top of the button.

9. The combined toothbrush, dental floss dispenser, and flossing device of claim 1, wherein the two fork tines which extend from the fork base, each have the same length and construction.

10. The combined toothbrush, dental floss dispenser, and flossing device of claim 9, wherein the tines each are of a length of from about 2 inches to about 4 inches.

11. The combined toothbrush, dental floss dispenser, and flossing device of claim 1, wherein, the tines are angled at an angle of from about 10 degrees to about 20 degrees which angle is that formed from the intersection a straight line along the center of the longitudinal length of the elongate body which passes through the threading hole and a straight line connecting the point of the threading hole and the tip of each of the respective tines.

12. The combined toothbrush, dental floss dispenser, and flossing device of claim 1, wherein the angled terminating portions which are angled and directed towards an opposing flossing side of the elongate longitudinal body have an angle towards the flossing section of from about 110 to about 130 degrees.

13. The combined toothbrush, dental floss dispenser, and flossing device of claim 1, wherein, each of the tines have a channel formed therein which extends from the tip of the tine to about ½ the length of the tine, and which passes through the entire angled portion of the tine.

14. The combined toothbrush, dental floss dispenser, and flossing device of claim 13, wherein each tine ends in a protrusion tip which protrude from an inside half of the channel of the angled tine and is from about 1 mm to about 3 mm in length.

15. The combined toothbrush, dental floss dispenser, and flossing device of claim 1, wherein the handle has a hollow portion containing spooled floss therein, and which is located between the first end and the second end of the elongate longitudinal body which is a plastic handle.

16. The combined toothbrush, dental floss dispenser, and flossing device of claim 15, wherein, the handle having a hollow portion is of a size in circumference which is sufficient to accommodate the grasp of a human hand.

17. The combined toothbrush, dental floss dispenser, and flossing device of claim 1, wherein the amount of spooled floss present in the hollow portion is sufficient for up to 1 month of daily use.

18. The combined toothbrush, dental floss dispenser, and flossing device of claim 17, wherein the amount of spooled floss is from about 1,000 inches to about 2,000 inches.

19. The combined toothbrush, dental floss dispenser, and flossing device of claim 1, wherein the amount of spooled floss remaining is designated by colored lines on the length of floss which is located in the spool located at the last 30 inches of floss.

20. A method of determining when to replace a toothbrush, the method comprising:

(a) providing a combined toothbrush, dental floss dispenser and flossing device, which device comprises:

an elongate longitudinal body having a toothbrush at a first end of the elongate longitudinal body, which has toothbrush bristles emanating from a brushing side of the elongate longitudinal body;

a fork located at an opposing second end of the elongate longitudinal body which fork comprises a fork base which has a button having an underlying recess, which button is positioned on the brushing side of the elongate longitudinal body, and two fork tines extending from the fork base, said fork tines having angled terminating portions which are angled and directed towards an opposing flossing side of the elongate longitudinal body; and, a handle having a hollow portion containing spooled floss therein which handle is located between the first end and the second end of the elongate longitudinal body, and which hollow portion has a removable cover thereover having an outside surface commensurate with the brushing side, and an inside surface facing the hollow portion containing the floss when affixed thereover, the outside surface having thereon a threading hole for threading the floss therethrough from the hollow portion, and a floss cutter, the floss cutter being located between the threading hole and the button having the underlying recess, and wherein, the amount of spooled floss present in the hollow portion is sufficient for up to two months of daily use; and, (b) employing the toothbrush and floss on a daily basis for a period of time until the supply of floss is exhausted.

* * * * *